US009717131B2

(12) United States Patent
Eskonen et al.

(10) Patent No.: US 9,717,131 B2
(45) Date of Patent: Jul. 25, 2017

(54) MOTION DETECTOR SYSTEM, LIGHTING SYSTEM WITH SUCH SYSTEM AND METHOD FOR DETECTING MOVING VEHICLES AND/OR PEDESTRIANS

(71) Applicant: Tvilight B.V., Groningen (NL)

(72) Inventors: Henri Eskonen, Groningen (NL); Amit Gudadhe, Groningen (NL); Jayakrishnan Harikumaran, Groningen (NL); Chintan Shah, Groningen (NL)

(73) Assignee: Tvilight B.V., Groningen (NL)

( * ) Notice: Subject to any disclaimer, the term of this patent is extended or adjusted under 35 U.S.C. 154(b) by 0 days.

(21) Appl. No.: 14/768,184

(22) PCT Filed: Feb. 14, 2014

(86) PCT No.: PCT/NL2014/050093
§ 371 (c)(1),
(2) Date: Aug. 14, 2015

(87) PCT Pub. No.: WO2014/126469
PCT Pub. Date: Aug. 21, 2014

(65) Prior Publication Data
US 2015/0382432 A1 Dec. 31, 2015

(30) Foreign Application Priority Data

Feb. 18, 2013 (NL) .................................... 2010323

(51) Int. Cl.
*B60R 16/03* (2006.01)
*H05B 37/02* (2006.01)
(Continued)

(52) U.S. Cl.
CPC ..... *H05B 37/0227* (2013.01); *F21V 23/0471* (2013.01); *G01J 1/4228* (2013.01);
(Continued)

(58) Field of Classification Search
CPC ........... G01S 2013/9342; G01S 13/867; G01S 13/87; G01S 2013/935; G01S 2013/9353; G02B 2027/0154
(Continued)

(56) References Cited

U.S. PATENT DOCUMENTS

| 5,986,357 A | 11/1999 | Myron |
| 2010/0265100 A1 | 10/2010 | Jalbout |
| 2010/0320917 A1 | 12/2010 | Tsou |

FOREIGN PATENT DOCUMENTS

| DE | 19910120 | 9/2000 |
| EP | 0977023 | 2/2000 |

(Continued)

*Primary Examiner* — Tuyet Vo
(74) *Attorney, Agent, or Firm* — Marcus C. Dawes; Daniel L. Dawes

(57) ABSTRACT

The invention relates to a motion detector system (2), a lighting system (14) with such detector system and a method for detecting moving vehicles and/or pedestrians. The motion detector system comprises: —a first motion detector (6a, 6b) for detecting vehicles and/or pedestrians having a speed in a first speed range, the first detector being arranged to detect moving objects in a first detection zone (d1, d2) having a first size, the first size determining the first speed range; and —a second motion detector (8a, 8b) for detecting vehicles and/or pedestrians having a speed in a second speed range, the second detector being arranged to detect moving objects in a second detection zone (d3, d4) having a second size, the second size determining the second speed range.

14 Claims, 9 Drawing Sheets

(51) Int. Cl.
   *F21V 23/04*   (2006.01)
   *G01J 1/42*    (2006.01)
   *G01J 1/44*    (2006.01)
   *F21W 131/103* (2006.01)

(52) U.S. Cl.
   CPC .......... *G01J 1/44* (2013.01); *F21W 2131/103* (2013.01); *Y02B 20/44* (2013.01)

(58) Field of Classification Search
   USPC ................ 315/76–81, 291, 224, 225, 209 R, 315/307–326, 185 S
   See application file for complete search history.

(56) References Cited

FOREIGN PATENT DOCUMENTS

| | | |
|---|---|---|
| EP | 1542187 | 6/2005 |
| EP | 2254395 | 11/2010 |
| GB | 2303701 | 2/1997 |
| GB | 2470926 | 12/2010 |
| KR | 20110010171 | 2/2011 |
| WO | WO-2009098848 | 8/2009 |
| WO | WO-2010116200 | 10/2010 |
| WO | WO-2012059842 | 5/2012 |

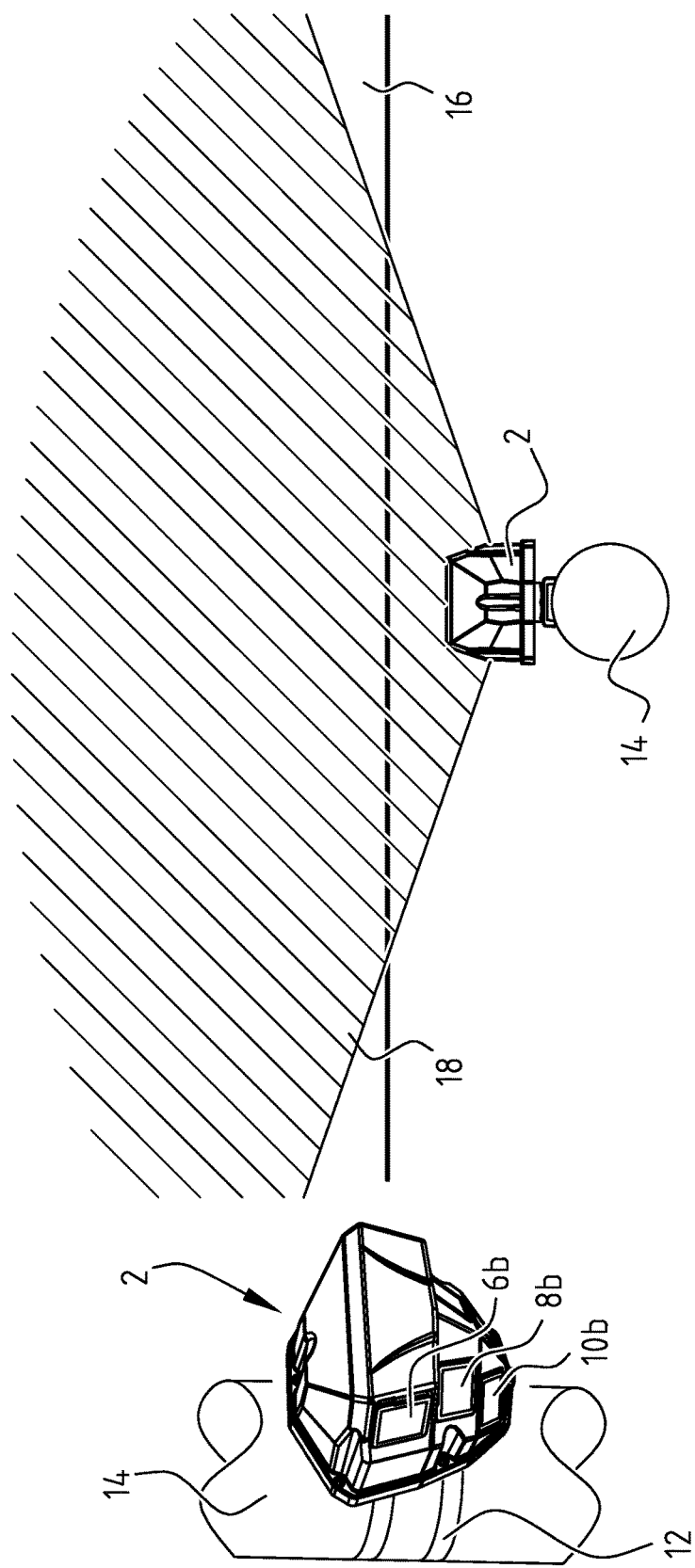

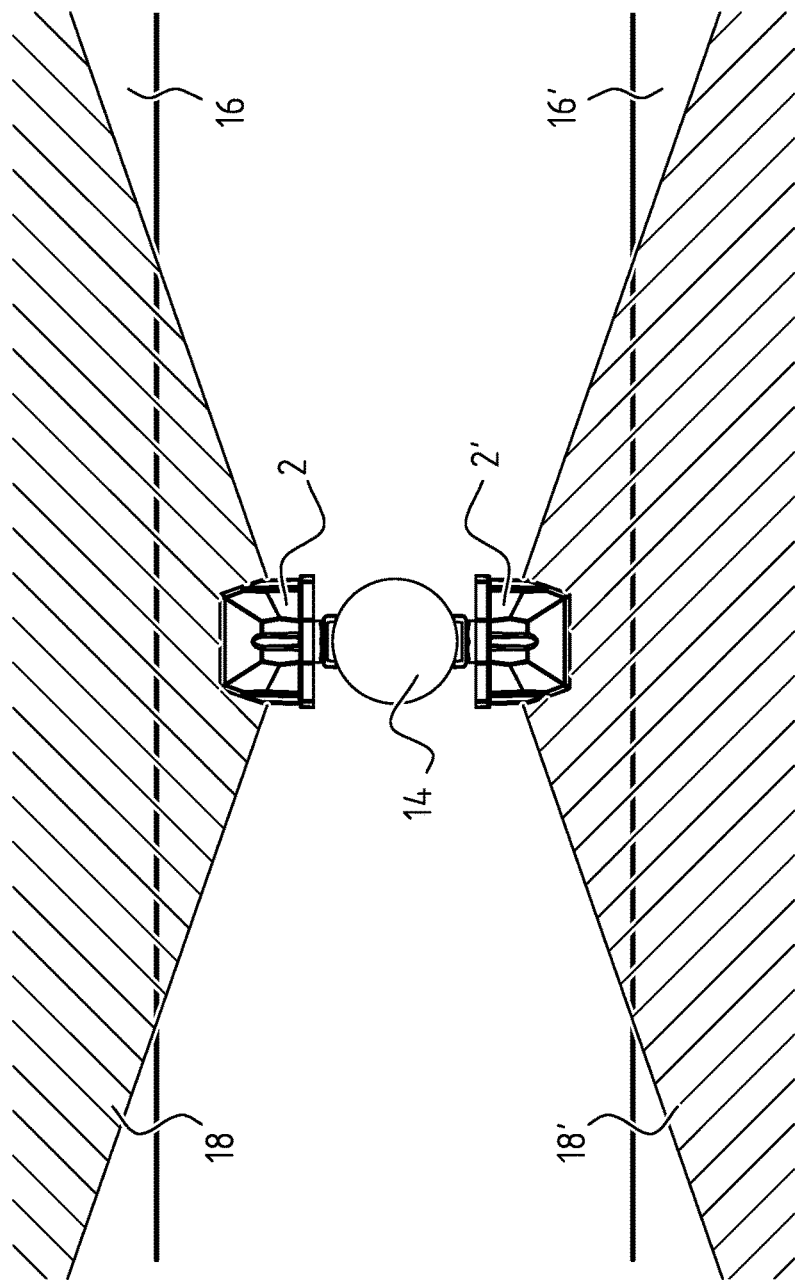
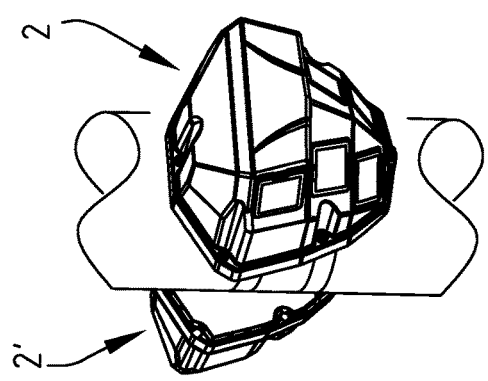
FIG. 3B
FIG. 3A

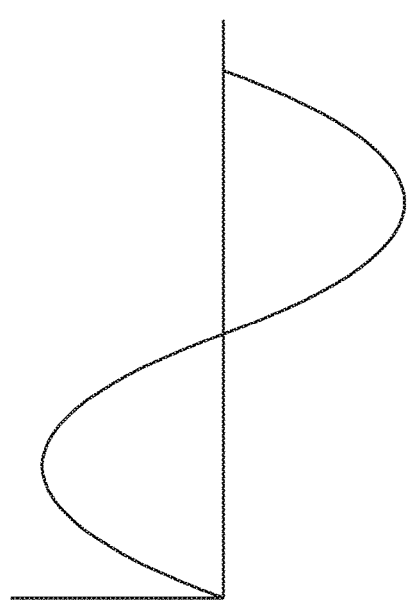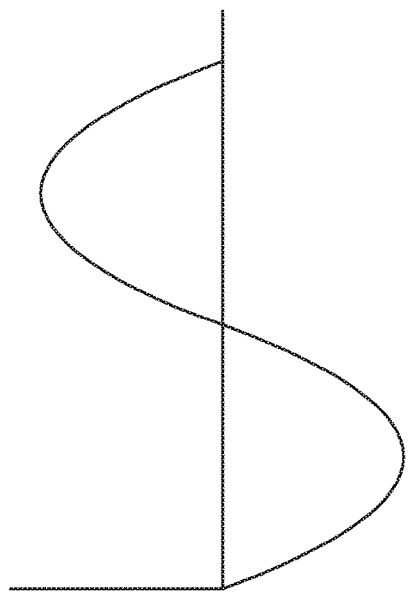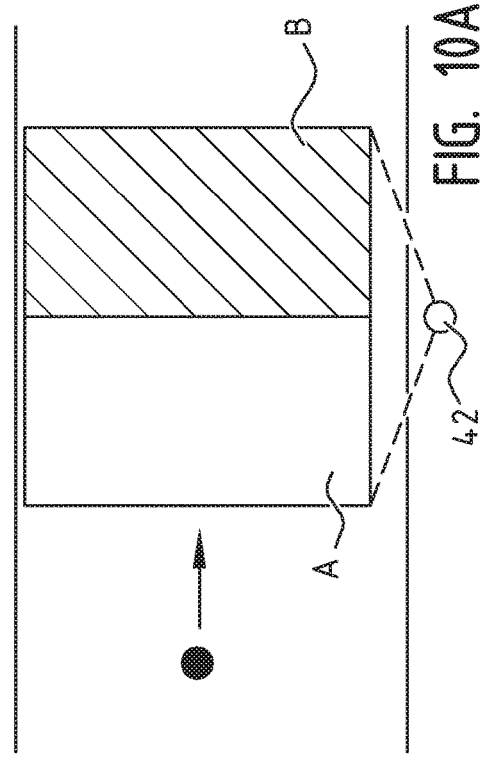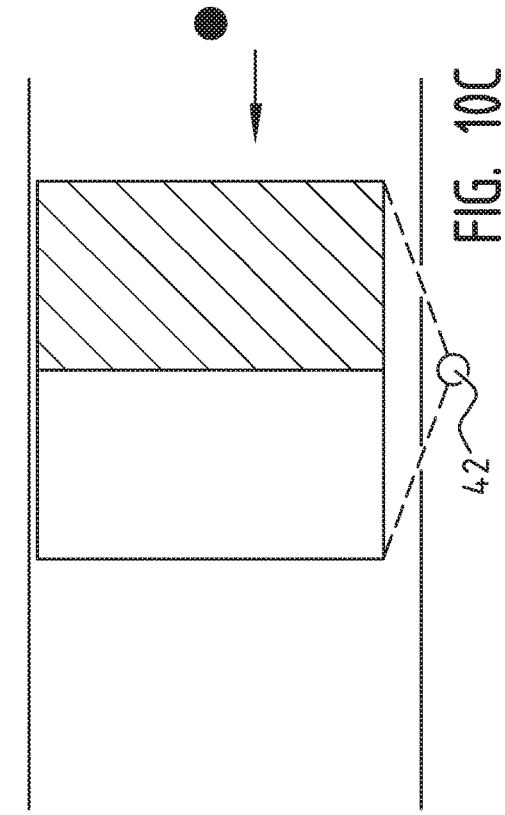

MOTION DETECTOR SYSTEM, LIGHTING SYSTEM WITH SUCH SYSTEM AND METHOD FOR DETECTING MOVING VEHICLES AND/OR PEDESTRIANS

The invention relates to a motion detector system. Such systems are able to detect the motion of moving objects, such as pedestrians, bicycles and cars. It is known in the art to connect a motion detector system to an electrical device, such as a lamp, such that the device is automatically activated upon detecting motion.

In many situations it is desired to detect the speed of an object, such as the speed of a pedestrian, bicycle or car. Conventional motion detector systems, such as radar or a system employing a camera, are able to detect the speed of an object by processing signals received from their detector, e.g. the radar receiver or the camera. Therefore, conventional systems require a processor of some sort, which has to be programmed for the desired application. In general, these algorithms are complex and require programming of the system by an expert. This makes conventional systems complicated and expensive.

An object of the invention is to overcome the above disadvantage and to provide a motion detector system which can distinguish between objects in different speed ranges in an effective and cost efficient manner.

This object is achieved by the motion detector system according to the invention for detecting moving vehicles and/or pedestrians and determining in which one of at least two speed ranges the speed of the detected vehicles and/or pedestrians falls, the system comprising:

- a first motion detector for detecting vehicles and/or pedestrians having a speed in a first speed range, the first detector being arranged to detect moving objects, such as vehicles and/or pedestrians, in a first detection zone having a first size, the first size determining the first speed range; and
- a second motion detector for detecting vehicles and/or pedestrians having a speed in a second speed range, the second detector being arranged to detect moving objects, such as vehicles and/or pedestrians, in a second detection zone having a second size, the second size determining the second speed range.

For example, the vehicles comprise cars, bicycles and motorcycles.

The first and second speed range are different, to be able to distinguish between objects having a speed in a different speed range.

On the basis of detection of motion by the first detector and/or second detector, the system can distinguish between vehicles and/or pedestrians in a first speed range—when the first detector detects motion—and vehicles and/or pedestrians in a second speed range—when the second detector detects motion.

A further advantage of the system according to the invention is that no complex signal processing is required to determine in which speed range a detected object falls. As each detector inherently is configured for detection in a given speed range, the fact that a given detector detects an object immediately gives the speed range of the detected object. Furthermore, the system can be provided with a sensor type which typically does not allow determination of the speed of motion, such as infrared sensors. Although a single such sensor cannot be used to distinguish between objects moving at different speeds, by combining at least two of such sensors in the system according to the invention, the object can be associated with a certain speed range. Therefore, no complex and expensive sensor types, such as radar or camera, are required.

Although no signal processing is required, a system according to the invention may use signal processing to process the signals from the motion sensor.

Moreover, the energy consumption of the system according to the invention is less than conventional systems. No complicated processing is required, so that the energy consumption due to processing components is reduced with respect to conventional systems, such as ultrasonic systems or camera systems. In particular, the invention allows the use of passive sensors, such as infrared sensors, which consume less energy than active sensors, such as ultrasonic sensors. This further reduces the energy consumption.

The size of each of the zones is selected to correspond to the desired speed range. For example, the size of the zones is defined by controlling the field of view, orientation or location of the respective detectors. For example, the detector is placed higher to obtain a detection zone with a larger projected area on the ground.

The size of the zones is preferably measured by the length and/or width of the projection of the zone on the ground.

More than two motion detectors may be provided. In a currently preferred embodiment of the invention, the system comprises three motion detectors, each arranged to detect motion in a respective detection zone corresponding to three different speed ranges.

Preferably, a first speed range corresponds to the speed typical of pedestrians, for example 0-10 km/h, 3-7 km/h or 4-6 km/h. Preferably, a second speed range corresponds to the speed typical of bicycles, for example 10-35 km/h, 15-30 km/h or 15-25 km/h. Preferably, a third speed range corresponds to the speed typical of cars, for example at least 30 km/h, at least 40 km/h or at least 50 km/h, such as a speed range of 30-180 km/h, 30-160 km/h, 30-140 km/h, 30-120 km/h, 30-80 km/h, 30-60 km/h or 30-50 km/h.

It is noted that in such a configuration a fast pedestrian may be detected as "an object having a speed typical for bicycles" or a fast bicycle may be detected as "an object having a speed typical for cars". For many applications this suffices, such that an identification of whether the detected object is a car, bicycle or pedestrian is not required.

The speed ranges may comprise only a lower or an upper limit, or both a lower and an upper limit.

There may be overlap in the speed ranges, but preferably the selected speed ranges are distinct, i.e. they do not overlap.

In a preferred embodiment, at least one of the detectors comprises an infrared motion sensor. Preferably, both the first and second detectors comprise an infrared motion sensor. In the case of a system with more than two motion detectors, preferably all detectors comprise an infrared motion sensor.

Infrared motion sensors are also known as PIR (passive infrared) motion sensors or simply PIR sensors. PIR sensors have the advantage that they are passive devices, i.e. they do not emit radiation. Therefore, PIR sensors are energy efficient. A further advantage is that they are relatively low in price as compared to for example radar, image processing or ultrasonic motion sensors. One type of conventional detector system is equipped with a camera for detecting motion. However, cameras can have the drawback of a negative public opinion due to privacy concerns related to surveillance cameras. Furthermore, cameras are relatively expensive and require additional processing.

The output V of a typical analog PIR sensor is given by:

$$V \propto \epsilon_{object} \tau_{atmosphere} \tau_{lens} A_{object} A_{detector} \Delta W R(\nu)/D^2,$$

wherein
- $\epsilon_{object}$: the emissivity of the object, typically 0.95;
- $\tau_{atmosphere}$: atmospheric transmittance, typically 0.95;
- $\tau_{lens}$: lens transmittance, typically 0.6;
- $A_{object}$: the area of the object;
- $A_{detector}$: the projection area on detector;
- $\Delta W$: the radiance of the object in the range of wavelengths $\lambda$ detectable by the PIR;
- $R(\nu)$: frequency response of the sensor, with $\nu$ denoting frequency; and
- D: distance to object.

The temperature of objects to be detected (humans, cars) is typically 300K-330K. For this temperature range Planck's law gives a maximum for the radiance $W(\lambda)$ around a wavelength $\lambda$ of about 8-13 µm. Therefore, most PIR sensors are sensitive in this wavelength range.

On the basis of Planck's law the radiance of the object in the range 8-13 µm can be calculated to be approximately $\Delta W \approx 74 \Delta T$, wherein $\Delta T$ is the difference in temperature between the object and the environment (note that most PIR sensors are differential sensors, i.e. sensitive to changes in temperature).

The quantities $\epsilon_{object}$, $\tau_{atmosphere}$, $\tau_{lens}$, $A_{object}$ and $A_{detector}$ can be considered constant for a given setup. This gives:

$$V \propto \Delta T R(\nu)/D^2.$$

Therefore, a larger temperature difference will give rise to a larger voltage of the output signal. Furthermore, as the distance between object and sensor increases, the output voltage of the PIR sensor decreases according to a square law. For example, a car has a higher temperature than pedestrians or cyclists due to its engine. Therefore, as the distance D is increased, at some point the output of the sensor will be too low to detect pedestrians or cyclists, but cars will be detected due to their higher temperature with respect to the environment.

Additionally, digital PIRs can be applied where the aforementioned signal processing is performed internally resulting in a digital information output.

Preferably, at least one of the motion detectors is arranged for detecting vehicles comprising an engine, such as a car or a motorcycle, by arranging said at least one detector such that detection zone has a size corresponding to a speed range typical for said vehicles. Examples of such speed ranges include: at least 30 km/h, at least 40 km/h, at least 50 km/h, at least 60 km/h, 30-180 km/h, 30-150 km/h, 30-140 km/h, 30-130 km/h, 30-120 km/h, 30-100 km/h and 30-80 km/h, 30-60 km/h and 30-50 km/h. Preferably, the motion detector for detecting vehicles is arranged such that the distance from the detector to the detection zone is such that the output voltage of the PIR is above a predefined first threshold when a vehicle comprising an engine crosses the detection zone and the output voltage of the PIR is below a predefined second threshold when a pedestrian or bicycle crosses the detection zone. The first threshold and second threshold may be different or equal. Therefore, the size of the detection zone and the distance to the motion detector can be selected on the basis of the difference in typical temperature and speed of vehicles with an engine versus objects without an engine, such as pedestrians and bicycles.

Preferably, the infrared motion sensor is of the type that operates in a differential manner. Such PIR sensors comprise at least two sensing elements in a reversed polarity configuration: a negative and a positive sensing element. This divides the field of view of the motion sensor into a number of zones corresponding to the number of sensing elements. For example, a common type of PIR sensor 42 comprises two adjoining sensing elements, thereby defining a positive zone A and a negative zone B (see FIGS. 10A and 10C). The output of the sensor 42 depends on the relative change in the infrared radiation from these two zones. An increase of IR radiation in the positive zone A will lead to an increase of the sensor output, whereas an increase of the IR radiation in the negative zone B will lead to a decrease of the sensor output. When an object passes the IR motion sensor 42, it passes both zones, leading to a bipolar signal. This will be illustrated further with reference to FIG. 10. If the object passes from the positive zone A to the negative zone B, as in FIG. 10A, the sensor output will be a signal starting from the baseline to a positive value, then returning to the baseline as the object moves towards the boundary between the positive and negative zone, then taking a negative value as the object is in the negative zone and returning to baseline again when the object moves out of the negative zone and out of the field of view of the sensor 42, as in FIG. 10B. If an object passes from zone B to A, as in FIG. 10C, the signal appears similar to FIG. 10D.

Preferably the infrared motion sensors are provided with a lens, such as a Fresnel lens, or a mirror, such as a focussing mirror. This enables adjusting the field of view of the sensor. Preferably, a lens is provided, as lenses are less prone to getting dirty, e.g. due to dust, and are easier to clean than mirrors.

In a preferred embodiment, at least one of the detectors comprises a lens or mirror arranged such that the respective detection zone is divided into at least two subzones.

For example, a lens or mirror having multiple optical axes is provided. Such a lens/mirror is also known as a multi-zone lens/mirror. In another example, multiple lenses or mirrors are provided.

A conventional lens or mirror has a single optical axis. Therefore, such a lens or mirror will project a single image on the infrared sensor. The image is divided by the PIR sensor into a positive zone and a negative zone. On the other hand, when using multiple lenses or mirrors, or a lens or mirror having multiple optical axes, multiple images are projected on the infrared sensor. In other words, the detection zone is effectively divided into a number of subzones, and each of the subzones is projected by the lens or mirror on the PIR sensor. The images of these subzones are overlapping each other on the sensor. Therefore, the sensor divides each of these subzones into a positive and negative zone. So effectively, instead of having a single positive and a single negative zone, the detection zone is divided into a number of positive and negative zones. This can increase the detection efficiency.

Preferably, the lens or mirror is arranged to divide the respective detection zone into four subzones.

Increasing the number of subzones will increase the detection efficiency, but only up to a certain point. If too many subzones are created, the subzones will become too small to effectively detect moving objects. In practice, the inventors found four to be an advantageous number of subzones for street lighting applications, e.g. for detection zones having a width and length of about 2-10 m, for example 3 or 4 m. Preferably, the subzones are arranged in two rows of two.

A lens or mirror which divides the detection zone into four subzones is particularly advantageous in the case of an infrared motion sensor having two sensing elements in a reversed polarity configuration as described above. Alternatively, an infrared motion sensor comprising more than two sensing elements, i.e. having a field of view divided into multiple negative and positive regions, can be used. For example, the infrared motion sensor comprises four sensing elements with two negative and two positive regions, e.g. arranged in a chessboard configuration. Preferably, the number of subzones $n_{lens}$ into which the lens or mirror divides the detection zone is chosen taking into account the number of sensing elements $n_{sensor}$. Preferably, $n_{lens}*n_{sensor}$ is selected to be equal to 4, 6, 8 or 12.

In a preferred embodiment, the first and second motion detector each comprise an infrared motion sensor having at least two sensing elements in a reversed polarity configuration thereby dividing the respective detection zone into at least one negative part and at least one positive part, the second motion detector being rotated with respect to the first motion detector
- about a substantially vertical axis to obtain a different location for the second detection zone than for the first detection zone; and
- about a second axis to at least partially compensate for rotation of the at least one negative part with respect to the at least one positive part of the second detection zone as compared to the first detection zone due to said rotation about the substantially vertical axis.

For example, the first motion detector is arranged in a first orientation in which the boundary between the at least one negative part and the at least one positive part of the first detection zone is directed in a first direction. The second motion detector is rotated about the second axis—being different from the substantially vertical axis—such that the boundary between the at least one negative part and the least one positive part of the second detection zone is directed in substantially the same direction as the first direction.

The location of the detection zones can be adjusted by rotating and/or tilting the respective motion detector. However, when using a differential PIR sensor, rotation of the sensor about a vertical axis will also rotate the respective negative and positive parts of the corresponding detection zone with respect to each other. Although the effect of this rotation on detection is relatively small at small angles, i.e. 1-5 degrees, rotation may negatively influence the detection efficiency at larger angles, i.e. angles equal or greater than 30 degrees, preferably equal or greater than 40 degrees, most preferably equal or greater than 45 degrees. For example, when monitoring a road, the negative and positive parts of the detection zone have to be orientated such that a vehicle or pedestrian travelling along the road first passes one of the negative or positive parts and subsequently the other. Rotation of the detector to adjust the location of the detection zone results in a change in the orientation of the negative and positive parts of the detection zone, which can result in incorrect alignment with respect to the road. This reduces the detector efficiency. The described embodiment of the invention solves this problem by compensating for the rotation about the vertical axis by rotation about a second axis, being different from the vertical axis. For example, the second axis is substantially perpendicular to the vertical axis. Preferably, the second axis is an axis substantially perpendicular to the sensing area of the sensor, i.e. an axis normal to the sensing area of the sensor, and/or substantially perpendicular to any lens/mirror, i.e. an axis normal to the lens/mirror. For example, the sensor and/or lens/mirror are rotated by 90 degrees about this axis.

In an application of the detector system along a road, the above has the advantage that the second motion detector can be configured to effectively detect objects along the road as far as 10-50 m away from the detector. Furthermore, the same sensor and/or lens can be used for the second motion detector as for the first motion detector. Using the same sensor and/or lens, different detection zones can be defined, wherein the locations of the negative and positive parts of the detection zone with respect to each other are controlled by rotation of the sensor about the second axis.

It is noted that the above embodiment is in particular advantageous when the system is placed to the side of the detection zone, such as when the system is attached to the vertical section of the pole of a street light and monitors the road next to the pole. This in contrast to a situation where the system is placed directly above the detection zone, such as when the system is attached to the horizontal section of the pole of a street light.

In a preferred embodiment, the system comprises at least two motion detectors for detecting vehicles and/or pedestrians having a speed in substantially the same speed range, being arranged to detect moving objects, such as vehicles and/or pedestrians, in respective detection zones having substantially the same size, said same size determining said same speed range, wherein the detection zones of said at least two motion detectors are provided at a distance from each other.

In other words, the system according to this embodiment comprises at least two motion detectors which each define a detection zone for detecting objects within the same speed range A and at least one further motion detector defining a detection zone for detecting object within a different speed range B. Preferably, two detectors are provided for each speed range, i.e. two detectors for speed range A and two detectors for speed range B.

By providing two detectors for each speed range, the detection efficiency is increased. For example, the detector system can be adapted to only output a signal indicating the speed range of a detected object if all detectors arranged for that speed range have detected an object within a predefined time interval. The time interval should be related to the distance between the respective zones and the common speed range.

Preferably, the at least two motion detectors configured to detect objects within the same speed range define detection zones which are non-overlapping or partly overlapping. For example, the detection zone of the first detector covers a part of the road to the left of the part of the road covered by the detection zone of the second detector.

In a currently preferred embodiment according to the invention, the system comprises two sets of motion detectors: two motion detectors for detection in a first speed range and two motion detectors for detection in a second speed range.

In a further preferred embodiment, the system further comprises a processing component connected to said at least two motion detectors adapted to determine the direction of a detected object on the basis of the order of detection by said at least two motion detectors.

For example, two detectors (A and B) are provided to detect objects in the speed range 5-15 km/h. Detector A has a detection zone to the left of the detection zone of detector B. If within a predefined interval first detector A and then detector B detects motion, the system outputs that motion was detected in a speed range of 5-15 km/h from left to right. If within a predefined interval first detector B and subsequently detector A detects motion, the system outputs that motion was detected in a speed range of 5-15 km/h from right to left.

Therefore, even if the motion detectors used in the system are not capable of detecting the direction of motion per se, the system is able to detect the direction of motion.

Preferably, the system comprises an output component for outputting a signal indicating the first and/or the second speed range.

In a preferred embodiment, the output component is configured to output a signal indicating one of:
the speed range comprising the lowest speed; and
the speed range comprising the highest speed,
when the first motion detector and the second motion detector both detect an object.

In cases where the speed ranges of the first and second detection zones overlap, both the first and second detector can detect the same object at the same time. In this embodiment, the output of the system in such a case is either the speed range comprising the lowest speed or the speed range comprising the highest speed. The speed range comprising the lowest/highest speed can be defined as the speed range having the lowest lower limit/highest upper limit. In one example, the speed range comprising the lowest speed is selected as output. For example, if the first speed range is 2-8 km/h and the second speed range is 5-18 km/h, if both detectors detect an object within a predefined time interval, the system outputs a signal corresponding to the first speed range, i.e. the interval 2-8 km/h. Effectively, the output of the system then corresponds to the speed ranges 2-8 km/h and 8-18 km/h, i.e. the lower limit of the second speed range is redefined by the operation of the output component. In a currently preferred embodiment, the speed range comprising the highest speed is selected as output. In many situations, selecting the highest speed is preferable due to safety considerations. For example, using the same speed ranges as before, if within a predefined interval both detectors have detected an object, the output corresponds to the second speed range, i.e. the interval 5-18 km/h, as this speed range includes the highest upper limit.

In a preferred embodiment, the system comprises an accelerometer, wherein the system is arranged to compensate output of the first and second detector for movement of the system detected by the accelerometer.

One of the envisaged applications of the system of the invention is to provide it on a lamppost of a streetlight, for controlling the streetlight on the basis of the detected motion. However, streetlight lampposts are known to move in the wind. This motion can be detected by the motion detectors in the system, which will lead to false triggers. For example, a hot car is parked in the field of view of a PIR sensor. The parked car is running stationary or has just been used such that it is still warm. Due to the movement of the detector system, the hot car may pass through the field of view of the PIR sensor, resulting in a false motion detection.

By providing an accelerometer, the system is able to compensate for this own motion, adjusting its output based on the detected acceleration.

For example, when using PIR motion sensors, the frequency of detection is registered. The accelerometer registers the frequency of motion of the detector system itself. If the frequency of detection is substantially equal to the frequency registered by the accelerometer, the detection of motion at that frequency is ignored.

The detector system according to the invention is preferably applied in an application for controlling lights, such as street lighting, indoor lighting and lighting in parking lots/garages.

The invention further relates to a lighting system, the lighting system comprising the motion detector system as described above;
at least one light source; and
a controller which is actively connected to the motion detector system and to the at least one light source for controlling the at least one light source on the basis of the detection of a moving object, such as a vehicle and/or pedestrian, by the motion detector system.

The same advantages and effects as described above for the motion detector system according to the invention apply to the lighting system according to the invention. Furthermore, features of both systems can be combined as desired.

For example, the lighting system defines "occupancy=no" and "occupancy=yes" levels for the light source, e.g. 40% and 90% respectively. When "occupancy=no" the lights will be at the low level, and when a presence is detected ("occupancy=yes") the light level will increase to the high level.

Preferably, the controller is arranged to control the light source based on the speed range in which the detected object is classified.

As the motion detector system can determine in which one of at least two speed ranges the speed of the detected vehicles and/or pedestrians falls, the controller can adjust the illumination level of the light source depending on this determination.

For example, the detection system is provided with three motion detectors, such that the system can distinguish between three speed ranges. The three speed ranges correspond to the typical speed of pedestrians, bicycles and cars, as described earlier.

Preferably, the lighting system comprises a number of lighting nodes forming a multi-node network, wherein each lighting node comprises:
a light source;
a controller connected to the light source; and communication means connected to the controller for communication between the lighting nodes, wherein at least one of the lighting nodes comprises a motion detector system. Lighting nodes comprising a motion detector system will, in the following text, be referred to as detector nodes.

In such a lighting node network, lighting nodes can communicate with each other to establish a lighting pattern upon the detection of a moving object by one or more of the detector nodes. Preferably, the controller of the detector node is adapted to send a control signal to at least one other lighting node in the network upon detection of an object. Thereby, multiple light sources can be controlled on the basis of the detection by the detection node. Preferably, the controller of the detector node is adapted to send a control signal to at least one of the other lighting nodes on the basis of the detected speed range.

The lighting system according to the invention enables creating a lighting pattern with the lighting nodes depending on the speed and/or direction of motion.

For example, when a detector node detects motion, it controls its light source to illuminate with an intensity of 100%. Subsequently, it sends a control signal to other lightning nodes according to a predefined relationship, for example according to its direct neighbors on a predefined path.

In the context of the application, a direct or first order neighbor of a first node is a second node which is next to the first node on a predefined path. The second order neighbor of a first node is a second node on a predefined path which is separated from the first node by exactly one other node. Generally, an n-th order neighbor of a first node is a second node which is separated from the first node by exactly (n−1) other nodes along a predefined path.

Returning to the example: upon receipt of the control signal generated by the detector nodes, the direct neighbors control their light sources to burn at a light level of 90%. The light level is preferably defined in the control signal sent by the detector node. Preferably, the detector node also sends a message to second order neighbors, such that their lights will burn at for example 70%. In this way, a person passing the light sources along a predefined path will be surrounded by an "envelope" of lighting.

The controller may directly control neighboring light sources, e.g. via an electrical connection, or may indirectly control neighboring light sources by communicating with a neighboring lighting system as described above, e.g. via wireless communication, ethernet, modbus, PLC.

The number of light sources activated in response to the detection of an object can be made dependent on the speed of the moving object. A faster moving object will require a larger light envelope than a slower moving object. The controller of the lighting system of the invention is preferably adapted to control the light sources such that a predefined envelope corresponding to the speed range determined by the motion detector system is applied.

It is noted that an overlap in speed ranges is possible. For example, a first speed range is 5-15 km/h and a second speed range is 10-30 km/h. In that case, preferably the system determines the object to be in the speed range comprising the highest speed. Alternatively, the speed range comprising the lowest speed can be selected by the system.

In a preferred embodiment, the lighting system further comprises a second motion detector system as described above, being connected to the first motion detector system, wherein the first motion detector system comprises the controller, the controller being arranged to control the light source based on the detection by both detector systems.

The first motion detector system acts as a master device, whereas the second system acts as a slave device. The master device comprises the controller which controls the at least one light source. The slave device is used for detection purposes only and sends its output to the master device. The master device can then control the light source taking into account the output of both detector systems. This enables a larger detection area to be covered by the lighting system, as objects in the field of view of both motion detection systems are taken into account. Typically, the field of view of the motion detection systems can be about 180 degrees or less. By providing two motion detection systems, 360 degree coverage can be obtained.

In another embodiment, the master and slave are integrated into a single casing which is mountable around a pole.

In a preferred embodiment, the lighting system comprises a casing, the casing comprising a mounting part for mounting the casing to a lamppost and a detachable part which is detachably connected to the mounting part, the mounting part comprising an electronic circuit for connection to the light source and electrical connection means for disconnectably connecting to further electronics, wherein the electronic circuit is configured such that the voltage over the connection means is below 30 V, preferably below 20 V, more preferably below 15 V.

In certain applications the lighting system according to the invention has to control a light source by using relatively high voltage levels, e.g. at least 50V, at least 100V or at least 120V. This poses a safety risk for personnel performing maintenance to the lighting system. The invention provides an electronic circuit in the mounting part which is configured to operate at these high voltage levels. Further electronics of the system, such as the motion detector system or part of the controller, can connect with this electronic circuit and operate at relatively low voltages. For example, the additional electronics, such as the motion detector system, is housed in the detachable part of the casing.

The invention further relates to a method for detecting moving vehicles and/or pedestrians and determining in which one of at least two speed ranges the speed of the detected vehicles and/or pedestrians falls, the method comprising:

detecting vehicles and/or pedestrians having a speed in a first speed range, using a first motion detector being arranged to detect moving objects, such as vehicles and/or pedestrians, in a first detection zone having a first size, the first size determining the first speed range; and detecting vehicles and/or pedestrians having a speed in a second speed range, using a second motion detector being arranged to detect moving objects, such as vehicles and/or pedestrians, in a second detection zone having a second size, the second size determining the second speed range.

The same advantages and effects as described above for the motion detector system and lighting system apply to the method according to the invention. Furthermore, features of the method and the two systems can be combined as desired.

Further details, advantages and effects will be elucidated on the basis of preferred embodiment, wherein reference is made to the accompanying figures.

FIG. 1 shows a front view of an embodiment of the motion detector system according to the invention;

FIGS. 2A-B show a perspective view (2A) and a top view (2B) of the motion detector system of FIG. 1 attached to a pole;

FIGS. 3A-B show a perspective view (3A) and a top view (3B) of an embodiment of a lighting system according to the invention with a master/slave configuration;

FIGS. 10A-D illustrate the working of a PIR sensor having two sensing elements with reversed polarities.

Figure 1:
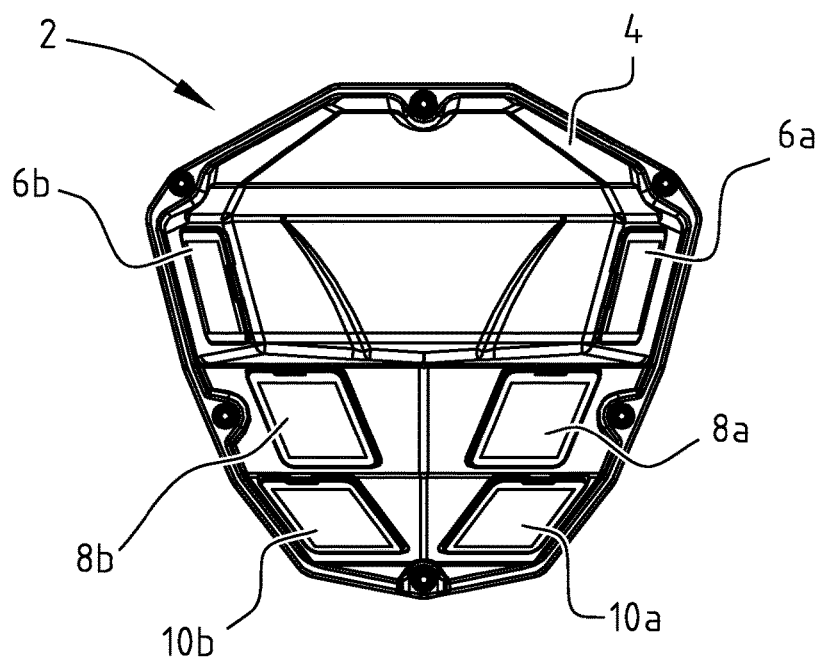

Motion detector system 2 (FIG. 1) comprises a casing 4 in which lenses 6a, 6b, 8a, 8b and 10a, 10b are provided. Each lens is provided in front of a PIR motion sensor (not shown). Lenses 6a, 6b are oriented with an angle of 10-30 degrees with respect to the vertical plane, i.e. the optical axes of lenses 6a, 6b show an angle of 10-30 degrees with respect to the horizontal plane. For lenses 8a, 8b this angle is 20-45 degrees, and for lenses 10a, 10b this angle is 30-60 degrees.

Motion detector system 2 (FIG. 2A-B) is attached by straps 12 to a pole 14 of a street lighting. The pole 14 is located near to street 16 to light up the street. The field of view 18 of detector system 2 is schematically illustrated in this figure. The detection zones will be illustrated in more details below with reference to FIGS. 6-9.

In an alternative embodiment according to the invention, the motion detector system is configured to be attached to a horizontal section of a street light, e.g. an upper horizontal part of the pole or the armature. In such a case, the motion detectors can be said to "look down". This has the advantage that no or at least almost no tilting of the sensors about a horizontal axis parallel to the road is required. The sensor may be tilted about a horizontal axis substantially perpendicular to the road, to define the position of the detection zone along the road. In other words, substantially only tilting about a single horizontal axis is required for defining the detection zones.

In an embodiment of a lighting system (FIG. 3A-B) according to the invention, motion detector system 2 acts a master. On the other side of pole 14 a second motion detector system 2' is attached. This second motion detector system detects motion on the second street 16' on the other side of pole 14. The field of view 18' of system 2' has been schematically illustrated. In this embodiment, system 2 comprises a controller for controlling the street light attached to pole 14. System 2' does not comprise a controller, but communicates the output of its detection to system 2, for example via an electrical connection. System 2 controls the lighting on the basis of the detection signals of both systems 2, 2'.

Figure 4:
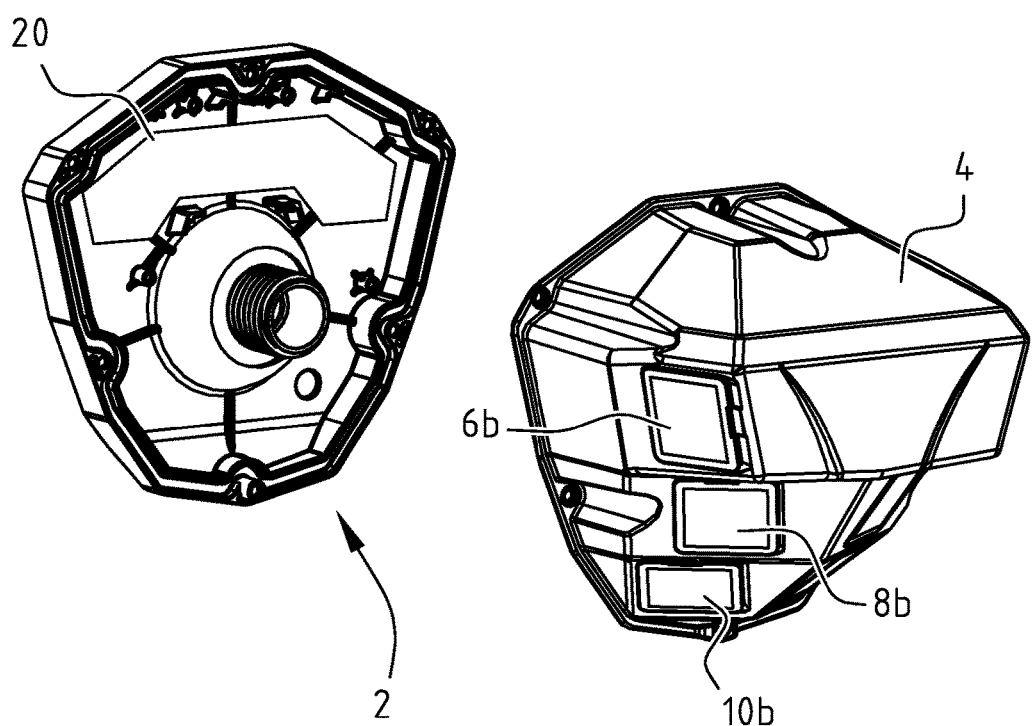
FIG. 4 shows a dissembled motion detector system according to FIG. 1.

The casing 4 comprises two parts (FIG. 4). A base part (left part in FIG. 4) is attached to the pole and comprises power circuit board 20. Controlling the light source is performed by circuit board 20. The removable part (right part in FIG. 4) houses the integrated electronics for operating the detectors. Via an electrical connection, the electronics of the removable part can communicate with the base part to control the lighting. With this configuration, the removable part only deals with relatively low voltages (in the order of 12V), whereas the higher voltages for the lighting are limited to PCB 20. This allows for safe maintenance of the system, as the removable part can be removed and serviced, without exposure to the higher voltage levels.

Figure 5:
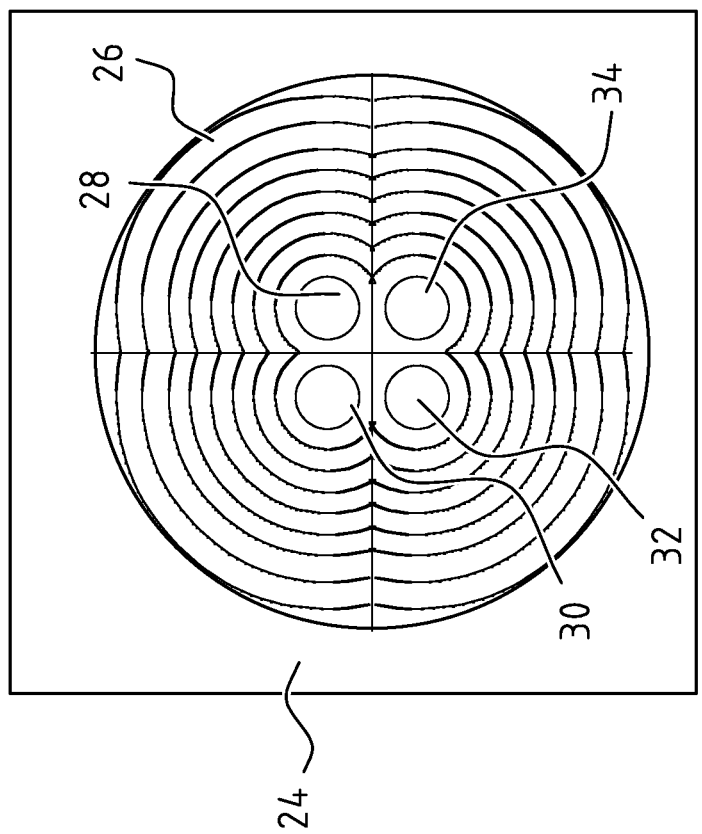
FIG. 5 shows a front view of one of the lenses of the motion detector system of FIG. 1.

Each lens 6a, 6b, 8a, 8b, 10a, 10b is a Fresnel lens as shown in FIG. 5. The Fresnel lens comprises a flange 24 for fixing of the lens in casing 4. The lenses show the annular segments 26 typical of Fresnel lenses. The lenses have four optical centres 28, 30, 32, 34, each defining a different optical axis. The focal length is the same for all lenses.

The effect of the lens having four optical centres will be described next with reference to FIGS. 6-9.

Figure 6:
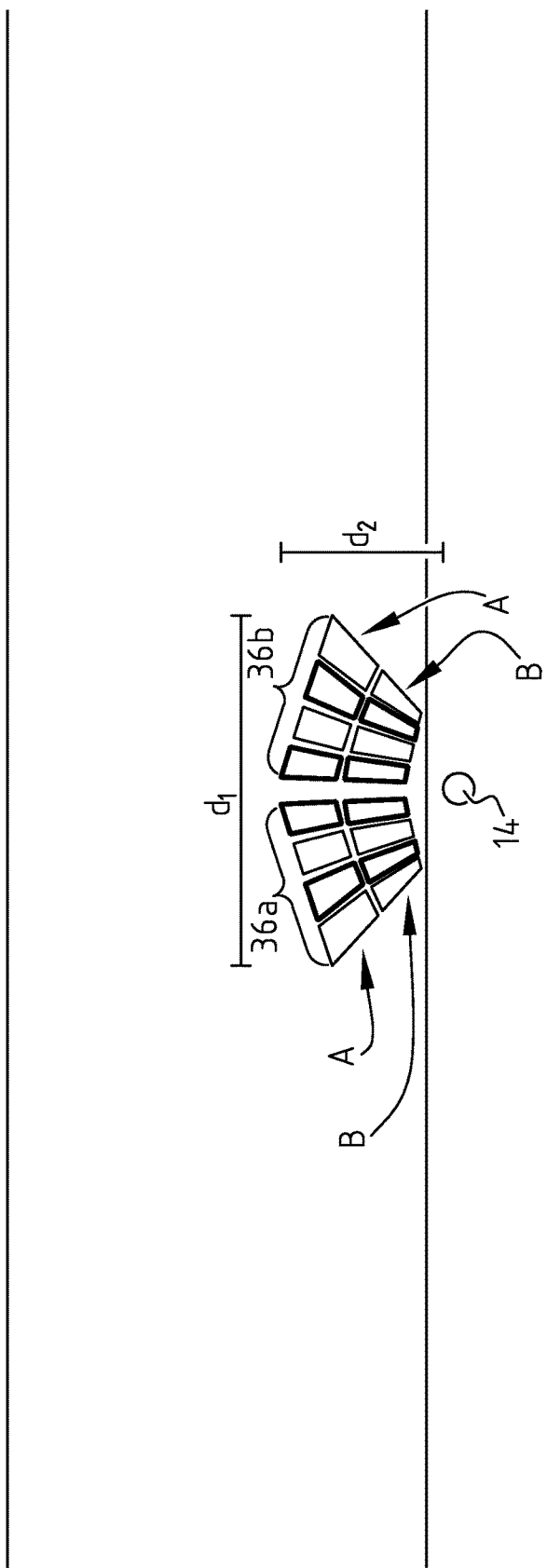
FIG. 6-9 show schematic top views of the detection zones and detection subzones of the motion detector system of FIG. 1.

The projection of the detection zone of lenses 10a, 10b and the corresponding PIR sensors is depicted in FIG. 6. The detection zone is divided into eight subzones, wherein each subzone comprises both a positive part (quadrilaterals with thin contours) and a negative part (quadrilaterals with thick contours). Four subzones 36a are due to lens 10a and four subzones 36b due to lens 10b. The upper two subzones A of subzones 36a are due to optical centres 28, 30 of lens 10a. The lower two subzones B of subzones 36a are due to optical centres 32, 34. Each subzone includes a negative and positive part. It is noted that the positive and negative part of the subzones are drawn spaced apart. In practice, the positive and negative parts usually adjoin each other.

The length d1 of the projection of the total detection zone is approximately 4 m, while the width d2 is approximately 3 m. Therefore, the length of each subzone, comprising one positive part and one negative part, is approximately 1 m. The PIR sensor has a typical bandwidth of 0.2-2 Hz. Therefore, this detection zone will be able to detect within a speed range of 0.2-2 m/s or 0.72-7.2 km/h. This is the speed range typical for pedestrians.

Figure 7:
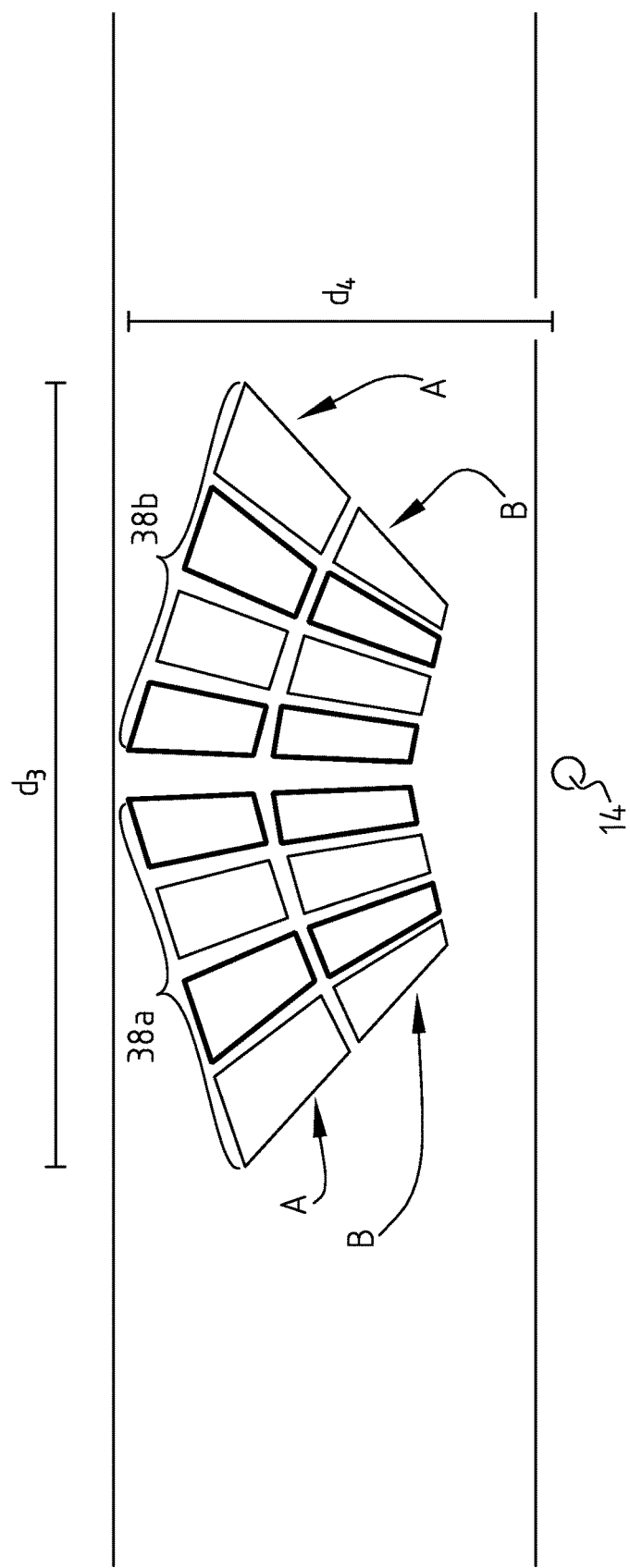

FIG. 7 shows the detection zone of lenses 8a, 8b and their corresponding PIR sensors. The layout is very similar to the layout shown in FIG. 6, due to the use of the same lens for all three sensor pairs. However, the size of the detection zone of FIG. 7 is larger due to the different tilting angle of the lens and sensor: the length d3 is 10 m and the width d4 is 7.5 m. The length of each pair of negative and positive parts is 2.5 m. Therefore, the speed range detectable by the sensors corresponding to lenses 8a, 8b is 0.5-5 m/s or 1.8 km/h-18 km/h. This is the typical speed range for bicycles.

Figure 8:
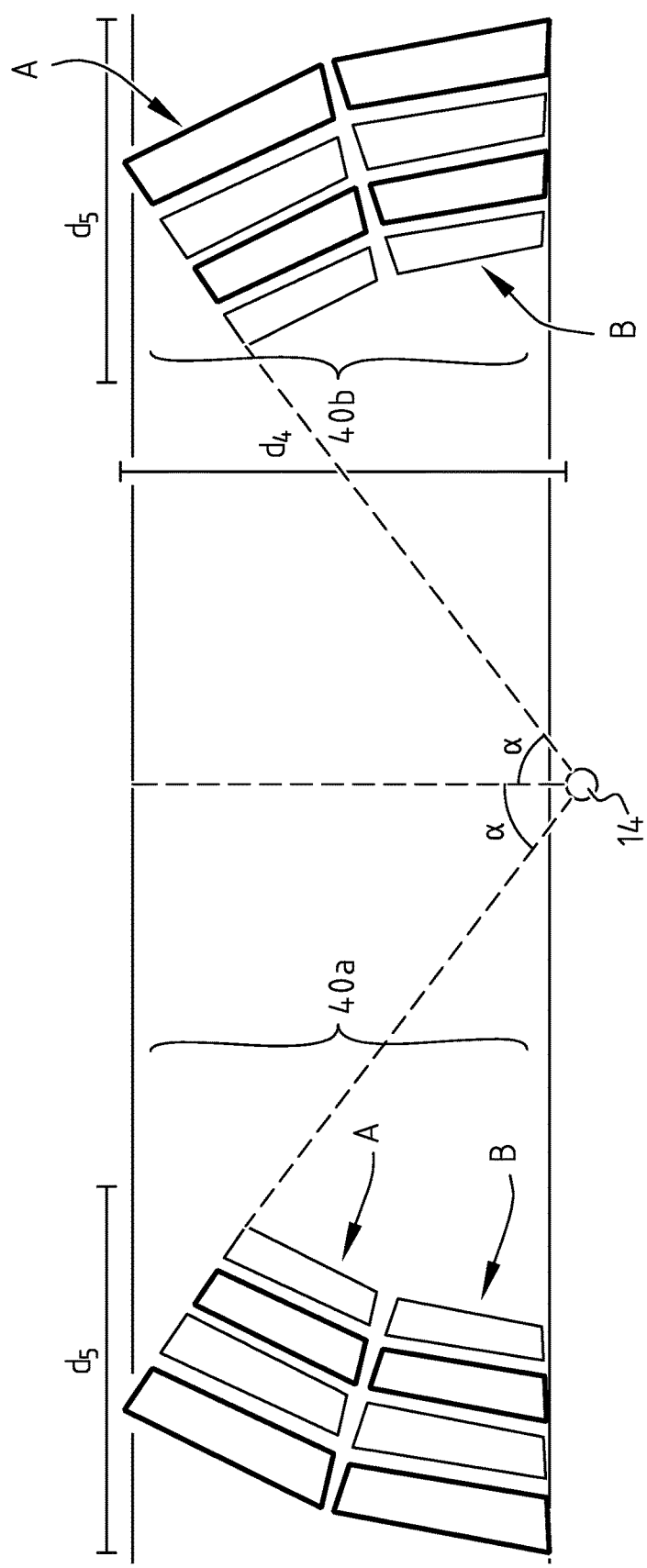

FIG. 8 shows the detection zone of lenses 6a, 6b. These lenses are orientated with their optical axes in more or less opposite directions. With respect to the detection zones of lenses 8a, 8b, 10a, 10b the lenses have been rotated about a vertical axis by an angle α of approximately 50 degrees. Furthermore the tilt of the sensor and lens have been adjusted. This results in two clusters of subzones 40a, 40b which are provided at a distance from each other. Furthermore, the lens and PIR sensor have been rotated 90 degrees about a horizontal axis perpendicular to the detection surface of the sensor, with respect to the configuration described in FIGS. 6 and 7. This ensures that the alternating positive and negative zones are still orientated in the desired direction with respect to the road, i.e. a vehicle passing subzones 40a and/or 40b will pass a sequence of alternating positive and negative parts.

The width d5 of each of the detection zones is about 50 meters. Therefore, each pair of negative and positive part has a width of approximately 25 m. The detection zones of FIG. 8 are therefore arranged for the detection of objects having a speed in the range of 5 m/s –50 m/s or 18 km/h-180 km/h.

Note that due to the increased field of view of detectors 6a, 6b, the minimal temperature for an object to be detectable is higher than in the smaller detection zones of FIGS. 6 and 7. This increases the ability of the system to distinguish between cars and pedestrians/cyclists.

Figure 9:
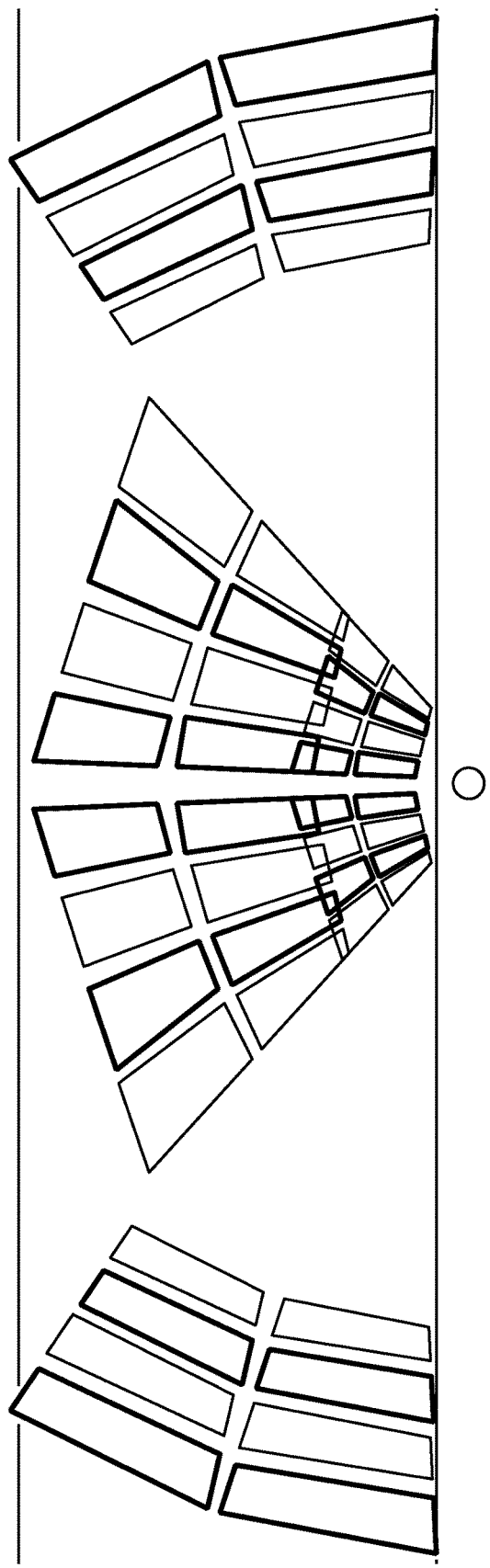

FIG. 9 shows an overview of all detection zones combined in one figure. Note that the pedestrian detection zone overlaps in space with the bicycle detection zone. The pedestrian detection zone is defined close to the pole 14, as this will be the usual place pedestrians are walking, e.g. on a sidewalk. Further note that the speed ranges of the pedestrian detection zone and bicycle detection zone overlap. In case both detectors detect an object, the system will output a signal corresponding to "bicycle", for safety reasons.

The detection by the system according to the invention of a car, bicycle and pedestrian will be described next with reference to FIGS. 6-8.

Imagine that a pedestrian travels along the street at 5 km/h. The pedestrian will pass the detection zones 36a-b (FIG. 6). As the speed of the pedestrian falls within the speed range of these detection zones, the PIR sensor belonging to lens 10a, 10b will trigger. Furthermore, as the speed of the pedestrian also falls within the speed range of the bicycle detector (detection zones 38a-b), the PIR sensor belonging to lens 8a, 8b will also trigger. On the basis of both detectors triggering, the system indicates that an object in the speed range 1.8-18 km/h has been detected. Alternatively, the system is configured to output a signal indicating the speed range 0.72-7.2 km/h when both detectors are triggered. Such an alternative configuration effectively redefines the speed ranges to 0.72-7.2 km/h and 7.2-18 km/h.

Next, a cyclist travels along the road at a speed of 16 km/h. The cyclist will be detected in the detection zones 38a-b of FIG. 7, as his speed falls within the speed range of 1.8 km/h-18 km/h. The PIR sensor of detection zone 36 will not detect the cyclist, as it is too fast for the speed range of this detection zone. Neither will the detectors of detection zones 40a-b detect the cyclist, as the cyclist is too slow to be detected by these detectors.

A car passing at a speed of 40 km/h will not be detected by the PIR sensors of either of the detection zones 36 and 38, as its speed is above the upper limits of the speed ranges of the corresponding motion detectors. As its speed falls within the speed range of the motion detector comprising lenses 6a, 6b, it will be detected by this motion detector.

The present invention is by no means limited to the above described preferred embodiments thereof. The rights sought are defined by the following claims, within the scope of which many modifications can be envisaged.

The invention claimed is:

1. Motion detector system for detecting moving vehicles and/or pedestrians and determining in which one of at least two speed ranges the speed of the detected vehicles and/or pedestrians falls, comprising:
   a first motion detector for detecting vehicles and/or pedestrians having a speed in a first speed range, the first detector being arranged to detect moving objects in a first detection zone having a first size, the first size of the first detection zone determining the first speed range; and
   a second motion detector for detecting vehicles and/or pedestrians having a speed in a second speed range, the second detector being arranged to detect moving objects in a second detection zone having a second size, the second size of the second detection zone determining the second speed range, wherein the first and second speed range are different.

2. Motion detector system according to claim 1, the first and second motion detector each comprising an infrared motion sensor having at least two sensing elements in a reversed polarity configuration thereby dividing the respective detection zone into at least one negative part and at least one positive part, wherein the second motion detector is rotated with respect to the first motion detector
   about a substantially vertical axis to obtain a different location for the second detection zone than for the first detection zone; and
   about a second axis to at least partially compensate for rotation of the at least one negative part with respect to the at least one positive part of the second detection zone as compared to the first detection zone due to said rotation about the substantially vertical axis.

3. Motion detector according to claim 1, further comprising an output component for outputting a signal indicating either the first or the second speed range, the output component being configured to output a signal indicating one of the speed range comprising the lowest speed or the speed range comprising the highest speed when the first motion detector and the second motion detector both detect an object.

4. Motion detector system according to claim 1, further comprising an accelerometer, wherein the system is arranged to compensate output of the first and second detector for movement of the system detected by the accelerometer.

5. Motion detector system according to claim 1, comprising at least two motion detectors for detecting vehicles and/or pedestrians having a speed in substantially the same speed range, being arranged to detect moving objects in respective detection zones having substantially the same size, said same size determining said same speed range, wherein the detection zones of said at least two motion detectors are provided at a distance from each other.

6. Motion detector system according to claim 5, further comprising a processing component connected to said at least two motion detectors adapted to determine the direction of a detected object on the basis of the order of detection by said at least two motion detectors.

7. Motion detector system according to claim 1, wherein at least one of the detectors comprises an infrared motion sensor.

8. Motion detector system according to claim 7, wherein at least one of the detectors comprises a lens or mirror arranged such that the respective detection zone is divided into at least two subzones.

9. Motion detector system according to claim 8, the lens or mirror being arranged to divide the respective detection zone into four subzones.

10. Lighting system comprising:
    at least one motion detector system according to claim 1;
    at least one light source; and
    a controller which is actively connected to the at least one motion detector system and to the at least one light source for controlling the at least one light source on the basis of the detection of a moving object by the at least one motion detector system.

11. Lighting system according to claim 10, wherein the controller is arranged to control the at least one light source based on the speed range in which the detected object is classified.

12. Lighting system according to claim 10, the at least one motion detector system comprising a first motion detector system and a second motion detector system connected to said first motion detector system, wherein the first motion detector system comprises the controller, the controller being arranged to control the at least one light source based on the detection by both motion detector systems.

13. Lighting system according to claim 10, comprising a casing comprising a mounting part for mounting the casing to a lamppost and a detachable part which is detachably connected to the mounting part, the mounting part comprising an electronic circuit for connection to the light source and electrical connection means for disconnectably connecting to additional electronics, wherein the electronic circuit is configured such that the voltage over the connection means is below 50 V.

14. Method for detecting moving vehicles and/or pedestrians and determining in which one of at least two speed ranges the speed of the detected vehicles and/or pedestrians falls, comprising:
    detecting vehicles and/or pedestrians having a speed in a first speed range, using a first motion detector being arranged to detect moving objects in a first detection zone having a first size, the first size of the first detection zone determining the first speed range; and
    detecting vehicles and/or pedestrians having a speed in a second speed range, using a second motion detector being arranged to detect moving objects in a second detection zone having a second size, the second size of the second detection zone determining the second speed range, wherein the first and second speed range are different.

* * * * *